United States Patent
Reiche et al.

(10) Patent No.: US 7,174,803 B2
(45) Date of Patent: Feb. 13, 2007

(54) STEERING SHAFT FOR MOTOR VEHICLES

(75) Inventors: Carl Reiche, Lemgo (DE); Burkhard Harhoff, Bielefeld (DE)

(73) Assignee: DURA Automotive Systems Reiche GmbH, Lage (DE)

( * ) Notice: Subject to any disclaimer, the term of this patent is extended or adjusted under 35 U.S.C. 154(b) by 94 days.

(21) Appl. No.: 10/464,021

(22) Filed: Jun. 18, 2003

(65) Prior Publication Data
US 2005/0022623 A1    Feb. 3, 2005

(30) Foreign Application Priority Data
Jun. 18, 2002  (DE) ............ 202 09 402 U
Aug. 9, 2002   (DE) ............ 202 12 294 U

(51) Int. Cl.
    *B62D 1/18*    (2006.01)
(52) U.S. Cl. ............... 74/493; 280/775; 464/167
(58) Field of Classification Search .......... 74/492, 74/493; 280/775, 777; 464/167, 183; 384/46, 384/50, 52
    See application file for complete search history.

(56) References Cited

U.S. PATENT DOCUMENTS

| | | | |
|---|---|---|---|
| 2,889,180 A * | 6/1959 | Jorgensen ............. 384/52 |
| 3,365,914 A | 1/1968 | Asher | |
| 3,635,314 A * | 1/1972 | Mazelsky ............. 188/372 |
| 3,884,051 A * | 5/1975 | Bottoms ............. 464/20 |
| 4,535,645 A | 8/1985 | De Bisschop et al. | |
| 4,898,566 A * | 2/1990 | Hakansson ......... 464/167 |
| 5,489,253 A * | 2/1996 | Ito et al. ............. 384/52 |
| 6,398,417 B1 * | 6/2002 | Teramachi ........... 384/491 |

FOREIGN PATENT DOCUMENTS

| | | |
|---|---|---|
| DE | 35 13 340 | * 10/1986 |
| DE | 38 13 422.5 | 2/1992 |
| EP | 1 158 190 A1 | 5/2001 |
| JP | 2-129405 | * 5/1990 |
| WO | WO 02/070855 | 9/2002 |

* cited by examiner

*Primary Examiner*—William C Joyce
(74) *Attorney, Agent, or Firm*—Gauthier & Connors LLP

(57) ABSTRACT

A steering shaft for motor vehicles which comprises an inner and an outer shaft part. Each shaft part has a polygonal cross section. The shaft parts engage one another in telescoping fashion and are positively connected to one another by barrel-shaped rolls that are effective as rolling elements for the transmission of a torque. The running paths of the rolls are fashioned between vertices on the outer sides of the inner shaft part and the inner sides of the outer shaft part and are designed so that the running paths are fashioned as troughs of a concavity approximating to the convexity of the rolls.

10 Claims, 2 Drawing Sheets

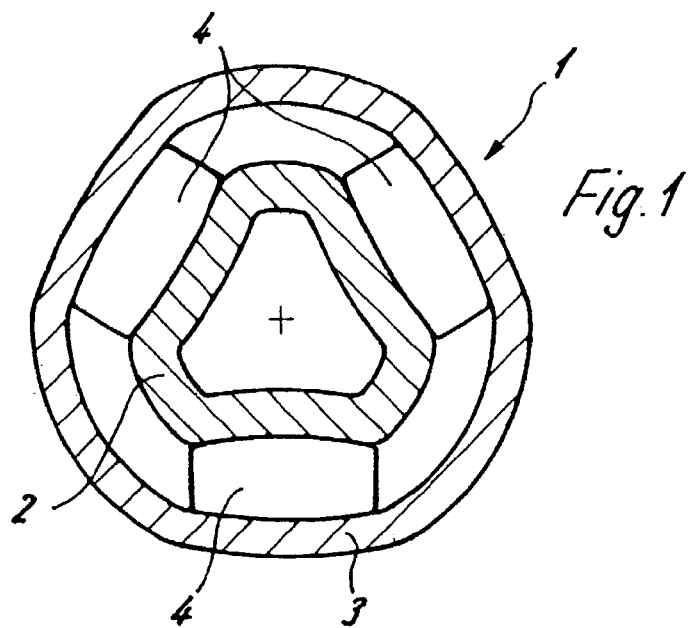
Fig. 1
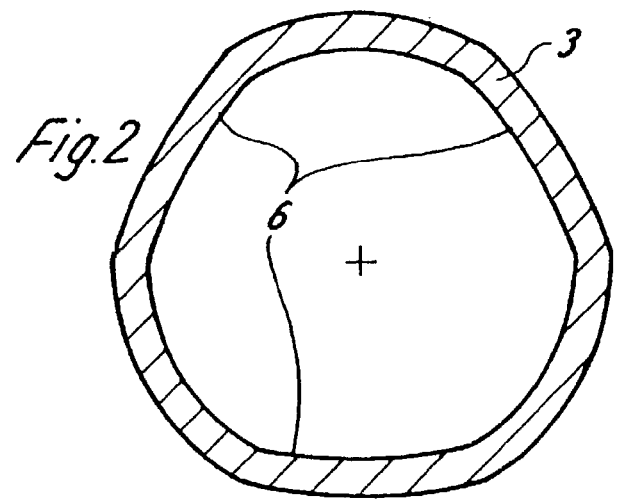
Fig. 2
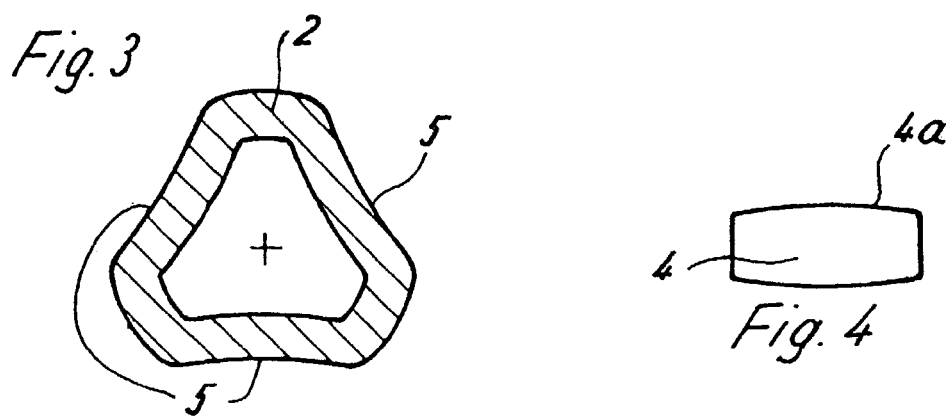
Fig. 3
Fig. 4

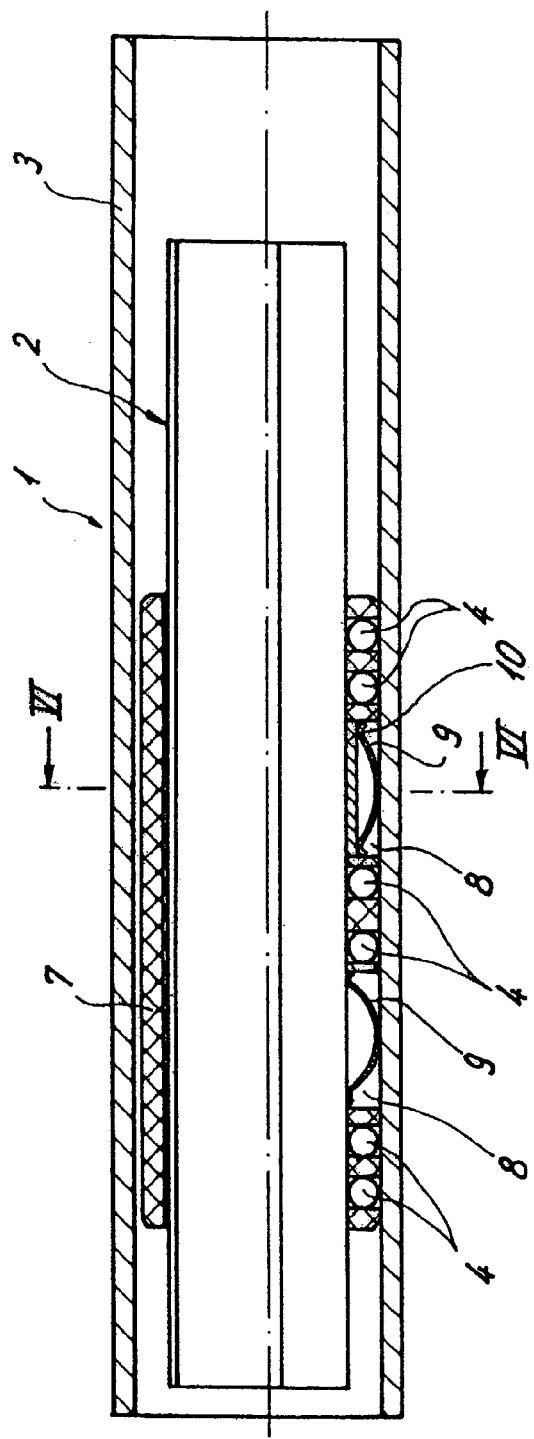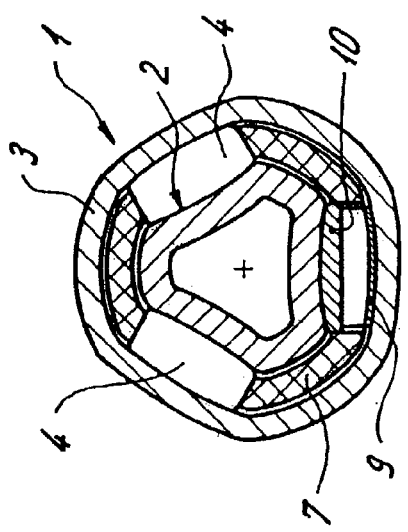
Fig. 5
Fig. 6

STEERING SHAFT FOR MOTOR VEHICLES

PRIORITY DATA

This application claims the benefit of German Pat. Appln. No. 202 09 402.2, filed Jun. 18, 2002, and German Pat. Appln. No. 202 12 294.8, filed Aug. 9, 2002.

BACKGROUND OF THE INVENTION

The present invention relates to steering shafts for motor vehicles and more particularly to steering shafts having an inner and an outer shaft part that are telescopically engaged.

In German Utility Model No. DE 38 13 422 C2 a steering shaft having an inner and an outer shaft is shown. The running paths for the rolls of the steering shafts are formed by planar regions between the vertices of shaft parts having polygonal cross sections. The rolls are cylindrical and are depicted in the drawings. Column 2, paragraph 2, of the application includes the statement that it may be advantageous to provide cylindrical rolling elements of special design. For example, rolls with conical or crowned ends, slightly barrel-shaped rolls, or the like. However, the application gives no explanation of why these particular designs may be advantageous.

A drawback associated with the use of planar running paths for cylindrical rolls is that very high compressive forces arise under torsional loading of the steering shaft, especially in the face edge region of the rolls, which forces can lead to indentations in the running paths. These indentations lead to non-uniform working and heightened, non-uniform displacement forces when the two shaft parts are displaced relative to one another in telescope fashion.

A drawback associated with the use of planar running paths for barrel-shaped rolls is that a high superficial pressure results between the rolls and the running paths because the rolls are only in point contact with the planar running paths which can lead to impressions in the running paths under torsional loading.

The present invention provides a steering shaft in which the surface pressure between the rolls and the running paths is reduced when the steering shaft is subjected to torsional loading and when the two shaft parts of the steering shaft telescope.

BACKGROUND OF THE INVENTION

The invention comprises a steering shaft for motor vehicles having an inner and an outer shaft part. Each shaft part has a polygonal cross section. The shaft parts are telescopically engaged and are positively connected to one another by barrel-shaped rolls that are effective as rolling elements for the transmission of a torque. Each running path of the rolls is fashioned between vertices on the outer sides of the inner shaft part and the inner sides of the outer shaft part. In one aspect of the invention, the running paths are fashioned as troughs of a concavity approximating to the convexity of the rolls.

Because of the adaptation of the cross-sectional shape of the running paths to the external generating curves of the rolls, a heightened surface pressure does not occur for either of the loading modes to which a steering shaft is subjected in service, whether in the face edge region of the rolls in the case of torsional loading, or over the longitudinal extent of the rolls when the two shaft parts telescope relative to one another. Thus, the useful life of the steering shaft is extended.

In yet another aspect of the invention, the running paths are at least surface-hardened or strengthened in any suitable manner. In this way there is a marked extension of the time span within which the working of the steering shaft remains backlash-free and easy to use, even under extremely high and frequent loading.

In another aspect of the invention, the rolls are guided in a cage.

In yet another aspect of the invention, the steering shaft comprises spring elements that are arranged between at least two opposite running paths. The spring elements are directly or indirectly braced under spring force against the respective running paths. The pressure applied to the inner shaft part presses the rolls guided on the other running paths against the outer shaft part, so that any play that may be present as a result of tolerance is compensated. Hence, in this way, torque transmission is effectively distributed.

The spring elements are preferably fashioned as leaf springs and are able to abut a pad. The pad abuts the inner shaft part and can be formed of any suitable material, e.g., plastic. Through a determinable friction coefficient of the pad, the ease of use brought about by the rolls is maintained when there is an axial displacement between the inner and the outer shaft part.

In one aspect of the invention, the spring elements are situated in chambers of the cage, specifically between two rolls. A plurality of chambers can be distributed over the length of the cage. In one aspect of the invention, one or optionally a plurality of spring elements are arranged in each chamber.

These and other objects, features and advantages of the present invention will become more apparent in light of the following detailed description of the preferred embodiments thereof, as illustrated in the accompanying drawings.

BRIEF DESCRIPTION OF THE DRAWINGS

FIG. 1 is a cross sectional view of a steering shaft embodying the invention;

FIG. 2 is a cross sectional view of the outer shaft part of the steering shaft embodying the invention;

FIG. 3 is a cross sectional view of the inner shaft part of the steering shaft embodying the invention;

FIG. 4 is a view of a roll of the steering shaft embodying the invention as it is inserted between the inner and the outer shaft part of the steering shaft;

FIG. 5 is a longitudinal cross sectional view of a steering shaft embodying the invention; and FIG. 6 is a cross sectional view of FIG. 5 taken along line VI—VI.

DETAILED DESCRIPTION OF THE INVENTION

FIG. 1 is a cross sectional view of a steering shaft 1. The steering shaft 1 is made up of an inner shaft part 2, an outer shaft part 3 and a plurality of rolls 4 effective as rolling elements. The inner shaft 2 and the outer shaft 3 each have a polygonal cross section.

The two shaft parts 2 and 3 engage one another in telescoping fashion and are positively connected to one another by rolls 4 for the transmission of a torque.

As shown in FIG. 4, the rolls 4 are barrel-shaped and thus have a convex outer contour 4a. Referring to FIGS. 1–4, shaft parts 2 and 3, each having polygonal cross sections, are each equipped with running paths 5 and 6, respectively. Rolls 4 are situated inbetween the vertices on the outer sides of inner shaft part 2 and the inner sides of outer shaft part 3. Running paths 5 and 6, respectively, are fashioned as concave troughs that correspond to the convexity of rolls 4.

In one embodiment of the invention, shaft parts 2 and 3 can be made in their entirety of a hardened material. In another aspect of the invention, shaft parts 2 and 3 are only subjected to surface hardening in the region of running paths 5 and 6.

Referring to FIGS. 5 and 6, the rolls 4 are guided in a cage 7 in a manner that is well known in the art. Through the adaptation of the shape of running paths 5 and 6 to the shape of rolls 4, the surface pressure between rolls 4 and running paths 5 and 6 is reduced for the loading and service modes. The loading mode comprises the torsional loading when steering shaft 1 is rotated about its central longitudinal axis. The service mode comprises the displacement of shaft part 2 within shaft part 3. In both modes, the load distribution or force distribution remains largely uniform over the entire length of rolls 4 so that the surface pressure remains practically equal over the entire length of running rolls 4.

Undesirable peaks with respect to the surface pressure between the components do not occur either when steering shaft 1 is torsionally loaded or when the two shaft parts 2 and 3 are displaced in telescope fashion relative to one another. Nor do they occur in a combination of these two loading modes thereby allowing ease of use and extension of the life of the steering shaft.

An alternative embodiment of the steering shaft 1 is depicted in FIGS. 5 and 6 wherein rolls 4 are held in cage 7. Between each pair of rolls 4 there is in cage 7, a chamber 8, in which there is situated a spring element 9, e.g., a bowed leaf spring.

While spring element 9 lying in chamber 8 and shown at the left in FIG. 5, is braced directly both against outer shaft part 3 and against inner shaft part 2, spring element 9, lying in chamber 8 and shown at the right in FIG. 5, exerts spring force indirectly on inner shaft part 2, to which end there is a suitable pad 10 having a low friction coefficient, which is in contact with inner shaft part 2.

According to a preferred embodiment of the invention, at least the surface of pad 10 that abuts inner shaft part 2 is adapted in crowned fashion in correspondence to the trough shape of the associated running path 5 of inner shaft part 2.

An adaptation of the cross-sectional contour is also conceivable for the side of spring element 9 that abuts running path 6 of outer shaft part 3.

In another embodiment of the invention, spring element 9 is fashioned in two identical parts. Each part extends in the direction of the longitudinal axis of steering shaft 1.

It is contemplated that the spring element 9 can be a spring leaf or any other suitable form, e.g., coil springs. In addition, the pad 10 can be configured to abut running path 6 of outer shaft part 3. In an alternative embodiment of the invention, the spring element 9 is a coil spring and the pad 10 is configured to contour the running path 5 of inner shaft part 2 and running path 6 of outer shaft part 3.

Although the present invention has been shown and described with a preferred embodiment thereof, various changes, omissions and additions to the form and detail thereof, may be made therein, without departing from the spirit and scope of the invention.

What is claimed is:

1. A steering shaft for motor vehicles which comprises an inner and an outer shaft part, each with a polygonal cross section, the shaft parts engaging in one another in telescoping fashion and being positively connected to one another by barrel-shaped rolls effective as rolling elements for the transmission of a torque, the running paths of the rolls each being fashioned between vertices on the outer sides of the inner shaft part and the inner sides of the outer shaft part, characterized in that the running paths are fashioned as troughs of a concavity approximating to the convexity of the rolls, said steering shaft further comprises spring elements at least between two opposite running paths, which spring elements are directly or indirectly braced under spring force against the respective running paths and wherein the spring elements comprise leaf springs.

2. The steering shaft according to claim 1 wherein the running paths are at least surface-hardened or otherwise strengthened.

3. The steering shaft according to claim 1 wherein the leaf springs are bowed.

4. The steering shaft according to claim 1 wherein the rolls and optionally the spring elements are held in a cage.

5. The steering shaft according to claim 4 wherein the spring elements are situated in chambers of the cage.

6. The steering shaft according to claim 5 wherein the chamber is provided between two rolls.

7. The steering shaft according to claim 1 wherein the spring element is braced against a pad abutting the inner shaft part and optionally outer shaft part.

8. The steering shaft according to claim 7 wherein the pad is comprised of plastic.

9. The steering shaft according to claim 1 wherein the spring element is comprised of at least two parts.

10. The steering shaft according to claim 9 wherein the two parts of the spring element are separated from one another in the longitudinal axis direction of the steering shaft.

* * * * *